(12) United States Patent
Kelley

(10) Patent No.: US 6,238,558 B1
(45) Date of Patent: May 29, 2001

(54) FILTER CHANGER WITH BIMODAL SEALING MEANS

(75) Inventor: Daniel K. Kelley, Westborough, MA (US)

(73) Assignee: Beringer LLC, Marblehead, MA (US)

( * ) Notice: Subject to any disclaimer, the term of this patent is extended or adjusted under 35 U.S.C. 154(b) by 0 days.

(21) Appl. No.: 09/587,777

(22) Filed: Jun. 6, 2000

(51) Int. Cl.⁷ .................. B01D 29/62; B01D 29/96; B29C 47/68

(52) U.S. Cl. .................. 210/236; 210/450; 425/185; 425/192 R; 425/197; 425/199

(58) Field of Search .................. 210/236, 232, 210/450; 425/185, 192 R, 197, 199

(56) References Cited

U.S. PATENT DOCUMENTS

| | | |
|---|---|---|
| 1,535,341 | 4/1925 | Riley . |
| 1,898,623 | 2/1933 | Gammeter . |
| 2,046,579 | 7/1936 | Penick et al. . |
| 2,282,502 | 5/1942 | Suth . |
| 2,590,696 | 3/1952 | Gregoire . |
| 3,119,624 | 1/1964 | Freed . |
| 3,450,411 | 6/1969 | Skinner, Sr. . |
| 3,653,419 | * 4/1972 | Schutter . |
| 3,684,419 | 8/1972 | Voight . |
| 3,830,508 | 8/1974 | Endicott . |
| 3,833,247 | 9/1974 | Puskas . |
| 4,130,285 | 12/1978 | Whitaker . |
| 4,358,262 | 11/1982 | Herbert . |
| 5,362,072 | 11/1994 | Dalton . |
| 5,439,589 | * 8/1995 | Whitman . |
| 5,507,498 | * 4/1996 | Trott . |
| 6,010,625 | * 1/2000 | Whitman . |

* cited by examiner

Primary Examiner—Thomas M. Lithgow
(74) Attorney, Agent, or Firm—Lahive & Cockfield, LLP

(57) ABSTRACT

A slide plate filter changer having an upstream seal ring bearing on the filter carrier in the operative position to prevent fluid leakage into the filter carrier channel. The seal ring is subjected to bimodal longitudinal forces respectively produced by screws adjustably bearing on tapered surfaces of the seal ring and the pressure force of the fluid resulting from the difference between the upstream and downstream effective surface areas of the seal ring.

4 Claims, 3 Drawing Sheets

FILTER CHANGER WITH BIMODAL SEALING MEANS

BACKGROUND OF THE INVENTION

This invention relates generally to filter changers for fluids comprising apparatus to replace a clogged filter with a fresh filter within a fluid flow passage. More particularly, it relates to filter changers useful in the polymer industry for the filtration of heated, pressurized polymer in liquid form as it flows from an extruder to any of various types of polymer forming equipment.

Typically, in the polymer application two or more filters are mounted in apertures on a carrier assembly adapted to locate the filters successively in an operative position that communicates between upstream and downstream polymer flow passages. The filter carrier assembly slides within a channel that extends transversely of the polymer flow passages through the operative position to the exterior of the filter changer, whereby clogged filters are made accessible for cleaning or replacement with fresh filters.

U.S. Pat. No. 4,237,014 to Trott and U.S. Pat. No. 3,675,934 to Heston illustrate typical known slide plate screen changers. These patents disclose two distinct sealing mechanisms intended to prevent leakage of polymer into the transducer channel. In the Trott patent sealing force is applied by means of a mechanically loaded assembly. Under predefined displacement the sealing surfaces are brought into contact with sufficient force to resist leakage at low operating polymer pressures. The Heston patent illustrates a different sealing mechanism whereby the polymer pressure is used to effect the sealing force. In either case the polymer or mechanical pressure is applied to a seal member, causing the seal member to bear on the upstream side of the filter carrier assembly or the filter then located in the operative position, thereby containing the polymer and preventing its flow into the filter channel. In this type of changer the sealing surface area is generally of small size and located close to the filter aperture, but it is sufficient to comply with, and remain in sealing contact with, small irregularities in the mating surfaces of the filter carrier, the filter channel and the flow passages.

Difficulties with the sealing means previously employed arise under conditions when the polymer pressure is substantially below the elevated level at which the filter changer is operated in normal use. Such conditions exist, for example, at start up or during idle periods of operation. During such periods the pressure exerted on the upstream seal is insufficient to prevent leakage of fluid into the transverse filter channel.

Problems also arise if filter changer assemblies cannot be easily disassembled for purposes of maintenance.

Accordingly, a principal object of this invention is to provide improved sealing means that are effective not only at normal operating pressures of the polymer, but during start up and idle periods when the polymer pressure is low.

A second object is to provide sealing means effective to establish a threshold force applied to the upstream seal that is effective to prevent polymer leakage when the polymer pressure is below a predetermined value.

A further object of the invention is to provide sealing means that are adapted to allow simple maintenance and disassembly procedures.

BRIEF SUMMARY OF THE INVENTION

With the foregoing objects in view, this invention features a combination of two sealing means effective for the foregoing purposes. The first means comprises mechanically adjustable screws acting on an annular tapered cam surface of the upstream seal to force it into contact with the filter carrier or operative filter. This seal provides complete containment of the polymer during start up or idle periods. The adjustment accommodates manufacturing tolerances and thermal expansion variables. The adjustment also enables the operator to remove the mechanical preload applied by the screws, facilitating removal, maintenance and reassembly of the changer parts including the slide plate and seals.

The second means of effecting a seal utilizes the polymer pressure force resulting from the difference between the upstream and downstream effective surface areas of the upstream seal member. This seal provides complete containment of polymer during the relatively long periods while the filter is online in normal operation. The polymer pressure actuated seal mechanism can be effective up to very high pressures, limited only by the structural integrity of the supporting body of the filter changer and related parts.

The dual means for sealing permit a dramatic improvement in machine operation under predictable operating parameters. Nearly all extrusion operations have periods of low pressure, either during start up or during idle periods. All extrusion operations have higher pressures during normal operation. Bimodal sealing meets the demands of the full range of operating conditions, and the adjustment capability permits reliable operation using cost effectively manufactured components and under adverse temperature conditions.

DETAILED DESCRIPTION

Figure 1:
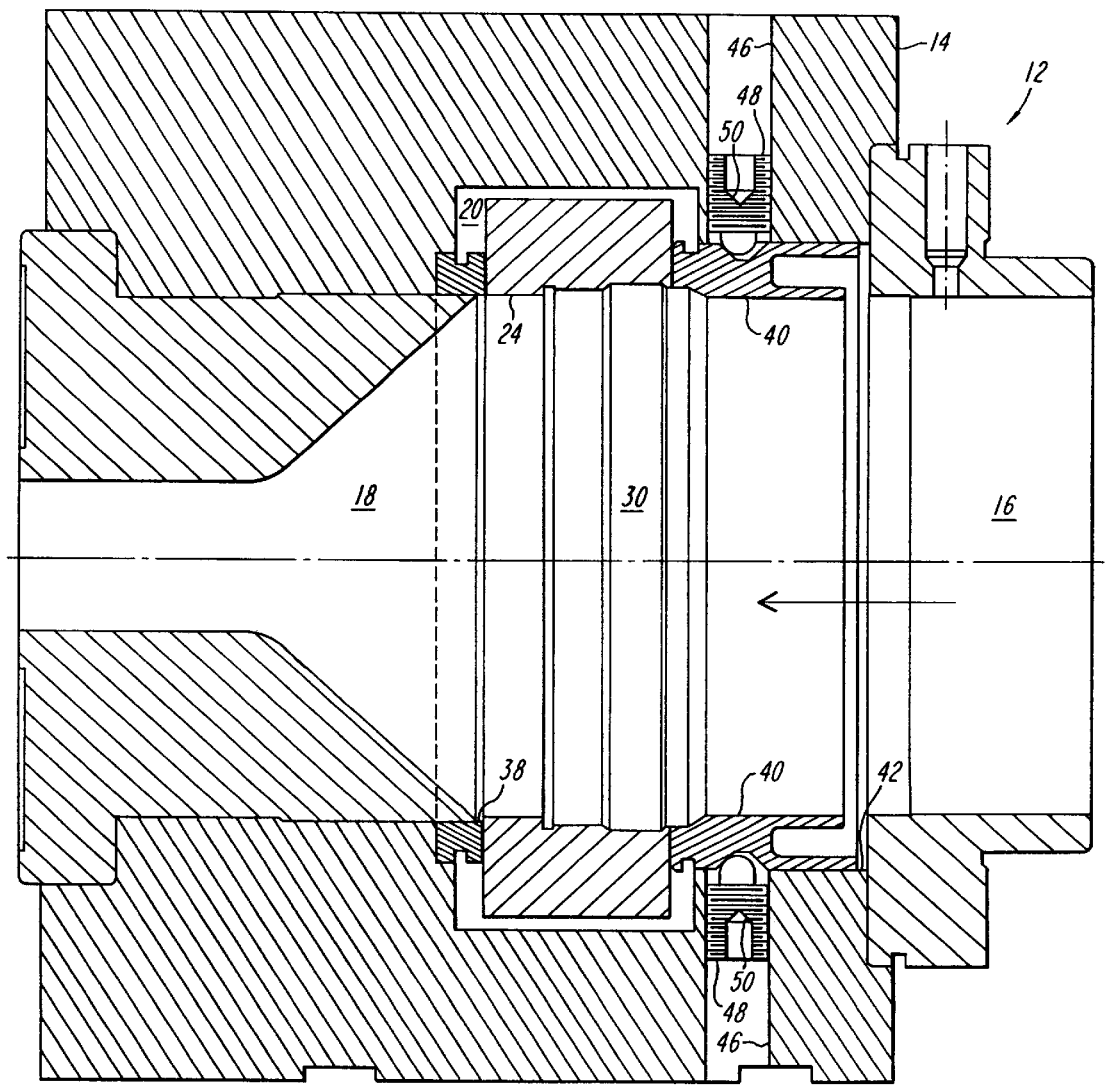
FIG. 1 is a longitudinal elevation in section illustrating the principal parts of the bimodal sealing system.
Figure 2:
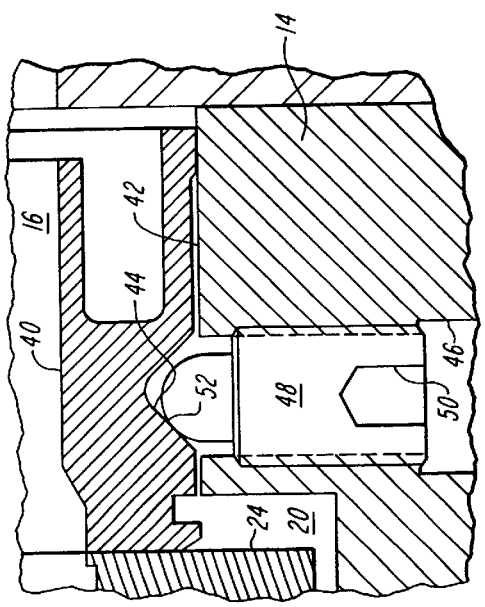
FIG. 2 is an enlarged fragmentary elevation of a part of FIG. 1.
Figure 3:
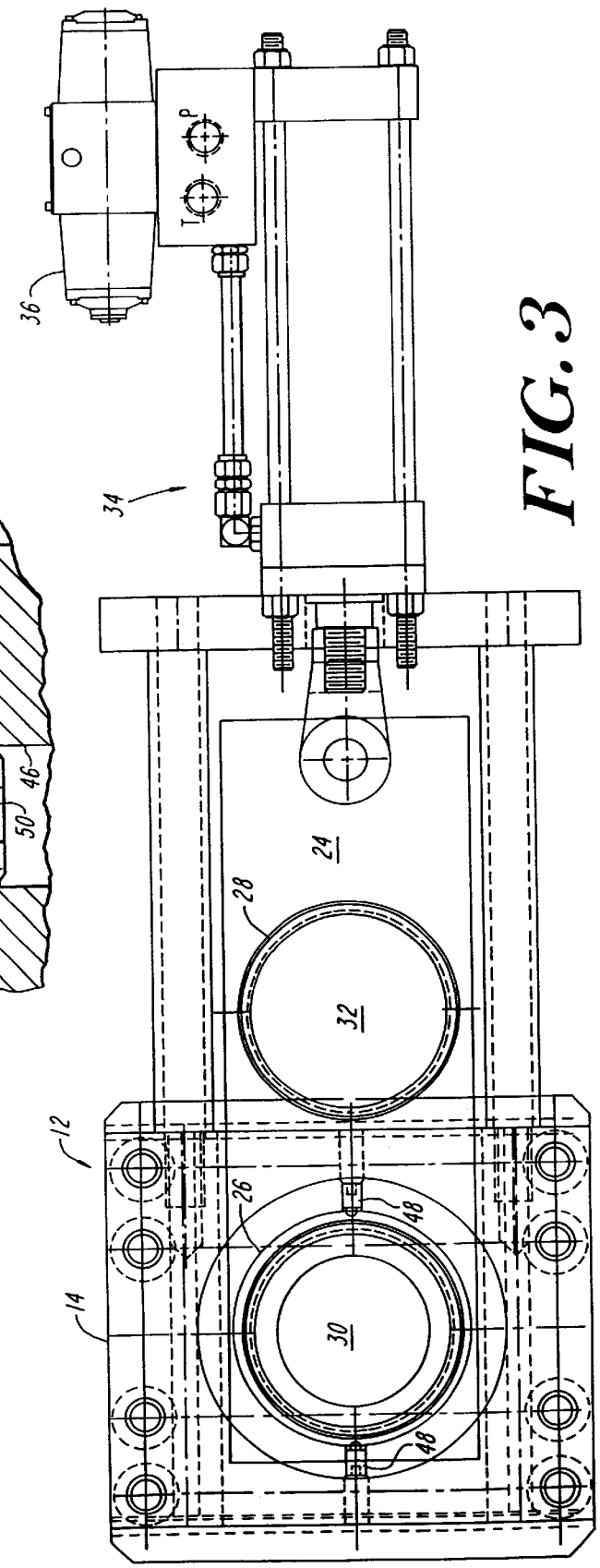
FIG. 3 is a transverse elevation of the screen changer.

FIGS. 1 to 3 illustrate a presently preferred embodiment of the invention comprising a filter changer designated generally at 12. A body 14 defines longitudinally aligned upstream and downstream polymer flow passages 16 and 18, respectively. The body also defines a channel 20 transverse to the passages 16 and 18. Filter carrier means movable in the channel comprise a slide plate 24 having one or more filter apertures 26, 28 each adapted to receive a filter 30, 32. Drive means 34 actuated by a hydraulic drive 36 are adapted to move each filter between an operative position communicating between the passages 16 and 18 and a position external to the body 14 where it may be removed for replacement and/or cleaning.

The body 14 has an annular downstream seat 38 bearing on the slide plate 24, thus providing a downstream seal against leakage of polymer into the transverse channel 20.

An annular upstream seal ring 40 is slidable on a cylindrical surface 42 formed in the body 14, and bears against the upstream side of the slide plate 24. The diameter of the surface 42 exceeds the inner diameter of the seal ring 40, whereby the upstream polymer pressure is applied to the seal 40 over an effective area greater than the effective area over which pressure is applied to the downstream side of the seal 40.

The sealing ring 40 is formed with an outer annular, conically tapered surface 44 (FIG. 2). A plurality of threaded holes 46 annularly spaced on radial axes are bored through the body 14, and each hole receives a specially formed threaded screw 48. Preferably, each screw has an internal socket 50 for receiving an adjusting wrench. The end 52 of each screw is dome-like, preferably of hemispherical shape, and bears on the tapered surface 44 of the seal 40.

In operation, the filter changer is assembled as shown in FIG. 1 with the slide plate initially moved to locate one of the filters 30, 32 in the operative position communicating between the passages 16 and 18. The screws 48 are turned to apply force to the tapered surface 44 of the seal 40, causing the seal to apply a predetermined mechanical preload force to the slide plate 24 or the filter in the operative position. The value of this preload force is set within limits such that the preload force is insufficient to prevent operation of the filter changer mechanism 34 which drives the slide plate 24 for changing the filters 30, 32. Also, the preload force is sufficiently high to seal the upstream and downstream surfaces of the slide plate 24 against leakage of polymer into the channel 20 at all polymer pressures from zero to a predetermined value at which the polymer pressure alone acting on the seal 40 is sufficient to prevent polymer leakage independently of the mechanical force applied by the screws 48. In a typical application, for example, the latter predetermined pressure value is about 750 psi.

Figure 4:
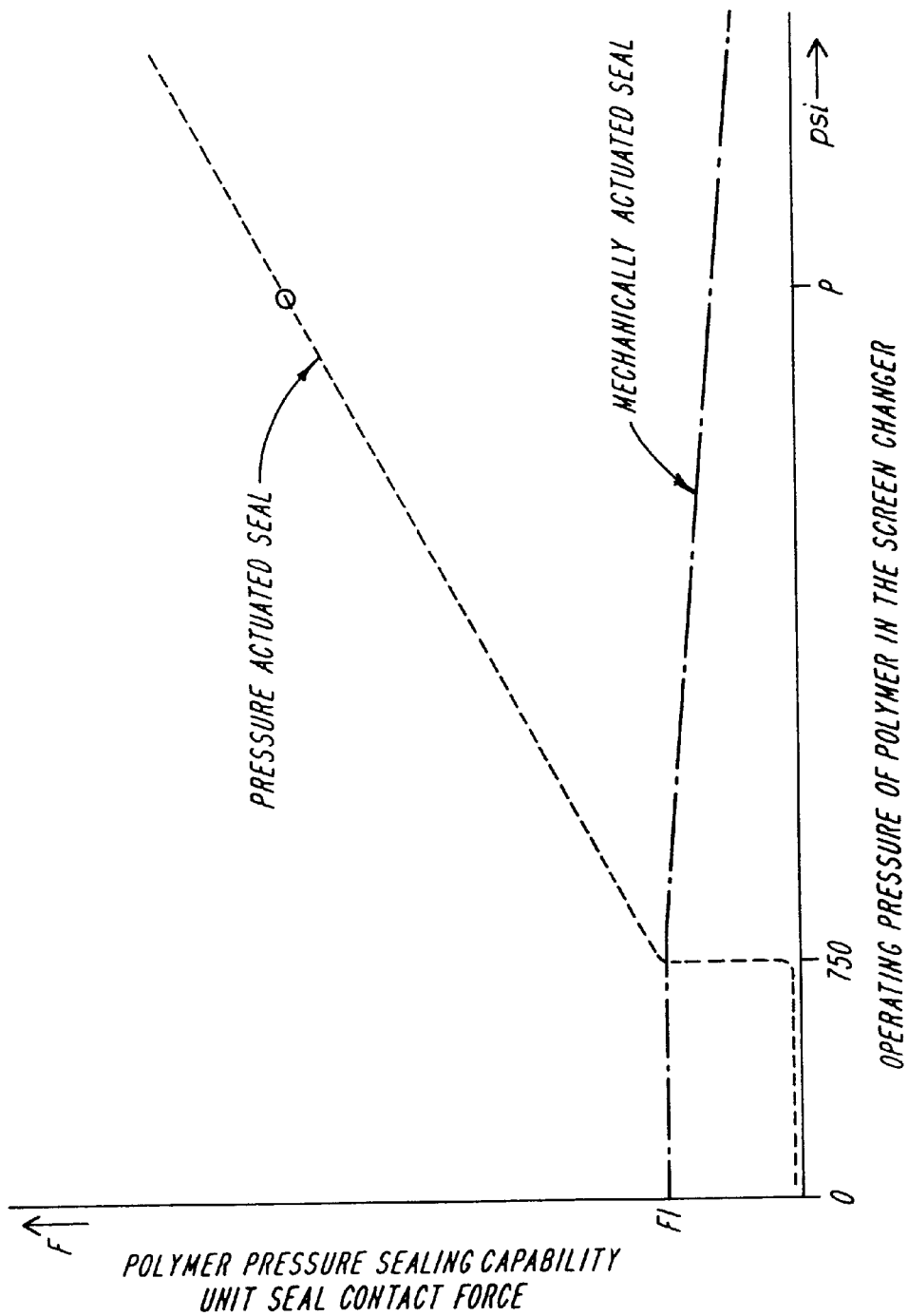
FIG. 4 is a diagram illustrating the force on the upstream seal member as a function of the polymer pressure.

Thus the screws 48 are effective to establish a threshold sealing force F1 as illustrated in FIG. 4. This threshold force is effective for polymer pressures between zero and the predetermined value, illustrated for the above example as 750 psi. At the predetermined value the force on the seal ring 40 applied by the polymer pressure and resulting from the difference between the upstream and downstream effective surface areas of the seal 40 equals the threshold force F1. As the polymer pressure continues to rise to a value P representing the normal operating pressure of the filter changer, the sealing force applied to the slide plate 24 exceeds the mechanical preload force, and the screws 48 are no longer operative to apply longitudinal force to the seal 40.

It will be noted that the above-described structure is such that the preload force may be readily reduced to zero by turning the screws 48, thus removing all longitudinal forces on the slide plate 24 for purposes of removal, maintenance and reassembly of the parts related to the slide plate and seals. After such operations are completed, the reassembled filter changer may then be quickly set up for operation by the initial application of the preload force as above described.

Also, the preload force is adjustable even during start up conditions at low polymer pressure. The preload force applied by the screws 48 may be readily adjusted to accommodate adverse temperature conditions affecting the expansion and contraction of the moving parts.

What is claimed is:

1. A filter changer comprising, in combination, a body defining longitudinally aligned upstream and downstream fluid flow passages and a channel transverse thereto and communicating therebetween, filter carrier means comprising a slide plate in the channel having an aperture, a filter in the aperture, and means for translating the slide plate for moving the filter between an operative position communicating between said passages and a position external to said body, said body having an annular downstream seat bearing on the filter carrier means about said aperture in the operative position, an annular upstream seal ring slidable in said body, bearing on the filter carrier means about said aperture in the operative position, and having an externally tapered surface, the upstream flow passage being formed to apply fluid pressure to said ring over an effective area greater than the effective area thereof exposed to the downstream fluid pressure, and a plurality of screws threaded in said body and having the ends thereof adjustably engageable with said tapered surface for applying a longitudinal component of force to said upstream seal ring against said filter carrier means.

2. A filter changer according to claim 1, in which said ends of the screws are dome-shaped.

3. A filter changer according to claim 1, in which the screws are adjustable to reduce said longitudinal component of force to zero.

4. A filter changer according to claim 1, in which the screws are adjustable to apply a predetermined longitudinal threshold force to said upstream seal ring at fluid pressures below a correspondingly predetermined value.

* * * * *